3,061,472
Patented Oct. 30, 1962

3,061,472
SIZING HYDROPHOBIC FIBERS WITH ACRYLATE POLYMERS AND GELATINIZED STARCH OR GRAFT COPOLYMERS THEREOF
Charles E. Brockway, Decatur, Ill., assignor to A. E. Staley Manufacturing Company, Decatur, Ill., a corporation of Delaware
No Drawing. Filed Mar. 2, 1960, Ser. No. 12,270
20 Claims. (Cl. 117—139.5)

This invention relates to the sizing of hydrophobic fibers and particularly to sizing with a composition of starch and certain synthetic polymers whether chemically combined or simply mixed.

Generally speaking, yarns of hydrophobic fibers are sized before weaving to increase weaving efficiency by preventing breaks and suppressing the effects of flaws in the yarns, such as knots, weak spots, etc. This most important purpose is served by imparting to the yarns increased strength and resistance to abrasion. To do this, the sizing material must form a film that adheres to the yarn, that is sufficiently lubricating to permit the yarn to slide over the various surfaces that come in contact with it, that is elastic and flexible and preferably forms a film that is transparent. Furthermore, in most instances, the sizing material should be readily removable by normal methods of desizing. All of these requirements are met by the sizing composition of this invention.

Common practice in sizing cotton yarns is to use aqueous starch pastes for sizing and these are excellent for the purpose. Unfortunately, however, starch pastes depend to a great extent on penetration of the yarn to obtain the necessary adherence of the film. The smooth, continuous-filament, hydrophobic synthetic fibers do not permit the use of starch since the starch does not adhere sufficiently to such fibers to be useful. I have discovered that it is possible to modify starch in such manner that the product will perform as satisfactorily as starch and yet will adhere well to continuous-filament yarns of hydrophobic fibers.

In the copending application of Brockway, Christman and Estes, Serial Number 12,269, filed March 2, 1960, there is disclosed a method of making a graft copolymer of pasted or gelatinized starch and certain acrylic monomers. Such graft copolymers are a great improvement as sizing compounds for hydrophobic fibers over either starch or the poly(acrylic acid) emulsions now used for the purpose. I have discovered that pasted starch and certain acrylic polymers in aqueous emulsion (whether combined with the pasted starch as a graft copolymer or simply mixed together) have greatly enhanced adhesion to hydrophobic fibers when the emulsion contains a proportion of certain nonionic surface active agents.

An object of this invention is to provide an improved sizing emulsion for hydrophobic fibers.

Another object is to provide a method for making such a sizing material.

A further object is to provide an improved method of sizing hydrophobic fibers.

Other objects will appear in the following description of the invention.

Stated briefly, the core of this invention is an aqueous emulsion whose dispersed phase is gelatinized starch and a polymer of an acrylic ester of an alkanol of two to four carbon atoms. The emulsion contains up to 30% by weight (based on the combined weight of starch and acrylic ester) of a nonionic surface-active agent of the type in which the hydrophilic portion consists of from 2 to 120 oxyethylene units. While concentrations of less than 1% may be used to some advantage, it is preferred to use at least 1%.

The term "graft" or "graft copolymer" is taken to mean the modification of an existing polymer, in this case gelatinized starch, by the addition of a different polymer at generally regular sites in the molecule of the existing polymer. It is generally agreed that a graft copolymer has a composite of the properties of the individual polymers. The existing polymer is chemically combined with the second polymer so that they are not separable by physical methods.

I have discovered that, in the presence of the particular class of surface active agents, it is not necessary to have the starch and acrylic ester polymer chemically combined to obtain a satisfactory sizing emulsion. However, because the adhesion of the graft copolymer is better, I prefer it to the mixture of starch paste and polymer emulsion.

In either case, the size is prepared with starch that is pasted or gelatinized in water. The word "starch" is used herein in its generic sense to refer to the various native starches (corn, potato, waxy maize, tapioca, rice, wheat, etc.), to dextrins and to the various modifications and derivatives that are available. The phrase "thin-boiling starch" is used herein to designate those starch products, whether modifications or derivatives, which, when gelatinized in water, produce pastes that are less viscous, cohesive and tacky and tend less to gel than the native starches. Such "modified" starches and starch derivatives include, for example, the hypochlorite-oxidized, the acid-modified, the ethers (e.g., hydroxyethyl and carboxymethyl ethers), the acetates, the enzyme-converted, and so on. I prefer to use the thin-boiling starches and dextrins because the viscosities of the starch pastes formed with native starch are often so viscous at usable solids content that the products in accordance with this invention are difficult to handle. The reason for this is that, after modification in accordance with this invention, the viscosity of the resulting paste is further increased. Accordingly, it is desirable to use starch of the thin-boiling type. Particularly good results are obtained in the sizing compounds prepared with starch oxidized with sodium hypochlorite; apparently the carboxyl groups introduced by the hypochlorite treatment aid in producing the improved results. The starch used in this process may also be of the "pre-gelatinized" variety which is prepared, for example, by drying starch on a hot roll; in this case, it is unnecessary to paste the starch as described above.

The proportion of starch to water during the preparation of the sizing emulsion is not critical. However, it is desirable to keep the starch content low enough to avoid too high a viscosity in the final product. On the other hand, I have found that somewhat better results are obtained when the graft copolymer is prepared at a relatively high solids concentration, up to 60%, and the resulting emulsion is diluted prior to application to the fibers. (The emulsion according to this invention is applied to the fiber at a solids content between 2 and 20%, depending on many factors inherent in the sizing machinery, the amount of size desired on the fiber, and other matters in the control of the fabric manufacturers. The emulsion of this invention is readily adaptable to a wide variety of such requirements.)

The graft copolymer is prepared by reacting an aqueous starch paste with the acrylic monomer in the presence of a free-radical catalyst. The catalysts used are typified by the peroxidic and hydroperoxidic compounds hydrogen peroxide, benzoyl peroxide and t-butyl hydroperoxide, by sodium hypochlorite and by the persulfate salts, for example, potassium and ammonium persulfates. I have found that better yields are often obtained by adding an adjuvant for the oxidizing catalyst. The adjuvant is usually a mild reducing agent and may be, for example, a ferrous salt such as ferrous ammonium sulfate, sodium sulfite or metabisulfite, or sodium formaldehyde sulfoxylate. The adjuvant may be added to the reaction mixture before the initiator is added or, when the initiator is added before the monomer, the addition of the adjuvant activator may be delayed until the monomer has been added. The extent of conversion of the monomer may be controlled by the addition of a suitable stopping agent, such as hydroquinone or others well known in the art. Otherwise, the reaction may be permitted to run until substantially all of the monomer is consumed, and this is preferred. The reaction is suitably performed at a temperature between 30 and 80° C. and at a pH in the range between 3 and 7. Higher temperatures tend to speed the reaction but care should be used to avoid temperatures so high that the catalyst is rapidly destroyed. In general, the same techniques are used and the same precautions observed as in emulsion polymerization.

The surface active agents in accordance with this invention may be added before the polymerization (whether for the graft copolymer or the mixed starch and polymer) or afterward or partly before and partly afterward, as desired. When at least part is added before polymerization, the product emulsion tends to have a finer and more uniform particle size.

For the mixture of pasted starch and acrylic ester emulsion in accordance with this invention, the acrylic ester emulsion is prepared by conventional emulsion-polymerization techniques in the presence of surface active agent. The acrylic ester emulsion is then blended with the starch paste. The same proportion of solids and the same ratios of starch to monomer and surface active agent to monomer are used as in the graft copolymer. Because the preparation of acrylic ester emulsions is somewhat delicate, it is desirable to add only the necessary concentration of surface active agent for the polymerization and then to add additional surface active agent to the blend or to the starch paste before blending with the emulsion.

The surface active agents, in accordance with this invention, are nonionic polyoxyethylene condensation products. Basically, these have a water soluble portion of from 2 to 120 oxyethylene units and a water insoluble portion that preferably contains at least one alkyl group with a total of 4 to 18 carbon atoms. The alkyl group may be linked to the polyoxyethylene chain through a phenoxy group. The class is exemplified by the alkylaryl ethers butyl phenoxy polyoxyethylene, heptyl phenoxy polyoxyethylene, octyl phenoxypolyoxyethene, nonyl phenoxypolyoxyethylene, tridecylphenoxypolyoxyethylene, and the like alkylphenoxypolyoxyethylenes; similar polyoxyethylene derivatives of methylene-linked alkyl phenols; thioethers of polyoxyethylene with nonyl, dodecyl, tetradecyl, t-dodecyl and the like alkyl groups (made by condensing ethylene oxide with mercaptans) or with alkylthiophenols having alkyl groups of four to fifteen carbon atoms; ethylene oxide derivatives of long-chain carboxylic acids, such as lauric, myristic, palmitic, oleic, and the like; and analogous ethylene oxide condensates of long-chain alcohols, such as octyl, dioctyl, decyl, lauryl or cetyl alcohols. Other species of the group are exemplified hereinafter.

A test has been devised to compare the sizing properties of the various formulations. In the test a fabric, for example, of polyester fiber such as Dacron, is carefully treated to make sure it contains no sizing. The fabric is washed in succession with dilute hydrochloric acid, dilute alkali and, after neutralizing, with a heavy-duty detergent. After rinsing carefully and drying, the fabric is cut into strips ⅝″ by 8¼″ with the long dimension in the direction of the warp. Each strip is pressed to remove wrinkles.

The fabric is laminated to a film of the essentially same composition; in the case of polyester fiber, such as Dacron, a polyester film is used such as Mylar. The film is cut into strips 1 inch by 8 inches. In preparing the laminates, one end of a strip of cloth and one end of a strip of film are brought together and clamped with a spring clamp so that at the other end the cloth extends beyond the film by ¼″. The clamped strips are immersed for 30 seconds in a 7.5% solids sizing composition at 120° F. During this period all air bubbles are removed by gently stroking with the finger tips. The strips are removed from the size, permitted to drain and gently wiped by pulling the strips between the thumb and forefinger. The laminated strips are then suspended in air maintained at 73° F. and 50% relative humidity and permitted to dry and condition for at least 24 hours.

The force required to separate the film and fabric is determined by means of a tensile-strength tester of conventional manufacture, an instrument called the Instron Table Model Tensile Tester. With the free end of the fabric clamped in the non-movable jaw, about one inch of the fabric is pulled from the film. The freed end of the film is then clamped in the movable jaw of the tensile-strength tester. The movable jaw is then moved at a rate of 50 inches per minute until exactly six inches are delaminated by the machine. The force required to pull the strips apart is continuously recorded and an average for each sample is obtained by integrating the area under the curve. Four or five identical samples are run for each test.

The following examples are presented to illustrate the invention with the understanding that the invention is not limited to the specific details disclosed. In the description of the examples all parts and percentages are by weight.

EXAMPLE 1

This example illustrates the preparation of the hydrophobic-fiber sizing emulsion in which the acrylic ester and starch are chemically combined in a copolymer. The copolymer was prepared using starch oxidized with sodium hypochlorite until it contained about 0.8 to 1.0% carboxyl groups. A starch paste was prepared by stirring 67.5 parts of the starch in 270 parts of water and heating at 99° C. (with reflux) for 30 minutes. While the paste was cooling naturally, 487 parts of unheated water containing 1.0 part of acetic acid, 0.30 part of ferrous ammonium sulfate and 6.6 parts of surface active agent were added. The surface active agent, which is sold under the trade name "Igepal CO–630," was the nonylphenoxy ether of polyoxyethylene having, on an average, 9.5 oxyethylene groups. It is preferable to dissolve these components in the additional water and add them to the paste as a solution, but this is not essential.

The paste was cooled until the temperature was less than 70° C. and 67.5 parts of ethyl acrylate was added. The temperature was adjusted to 50° C. Then 0.90 part of 50% hydrogen peroxide was added. Within a few minutes the temperature rose spontaneously and was adjusted to 60° C. and held at this temperature for three hours under constant vigorous agitation. At the end of the heating cycle, the stable emulsion that was formed was cooled at 30° C. and 8 parts of a 0.5% aqueous solution of phenyl mercuric acetate was added as a preservative. The emulsion was tested as described above, and the delamination force required was 43.5 grams.

Samples of Dacron yarn were sized with the product of this example at 7.5% and at 15% solids. The sized yarn samples were tested for abrasion resistance on a Walker Abrader, an instrument manufactured by the U.S. Testing Co. and used in the textile industry for this purpose. The test results (average of five yarn samples each) were 260 and 371 cycles respectively. In a repeat, the values were 240 and 354 cycles respectively. For comparison, a commonly used sizing material was also run at 7.5% and at 15% solids; this was a five-to-one mixture of hydroxyethyl ether of starch and poly(vinyl alcohol). The results were 32.2 and 49.3 cycles (average of five yarn samples each). For unsized Dacron yarn, the average was 18.8 cycles.

EXAMPLE 2

This example illustrates the method of preparation of the physical mixture of starch paste and poly(ethyl acrylate) emulsion. Twenty parts of the same hypochlorite-oxidized starch as in Example 1 was suspended in 80 parts of water, and the suspension was heated to 99° C. and maintained there for 30 minutes to form the starch paste. The starch paste was then permitted to cool to room temperature.

The poly(ethyl acrylate) emulsion was prepared separately. A solution of surface active agent was prepared by dissolving in 50.8 parts of water, 1.20 parts of the nonylphenoxy ether of polyoxyethylene containing 30 oxyethylene units (sold under the trade name "Igepal CO-880"), 0.41 part of the same surface active agent as in Examples 1 and 2. 34 parts of tetrasodium N-(1,2 dicarboxyethyl) - N - octadecyl sulfosuccinamate (sold under the trade name "Aerosol 22"). The anionic surface active agent sulfosuccinamate salt was used because no pasted starch was present; when pasted starch is used, it has the additional advantages of reducing the tendency of the emulsion to coagulate and of reducing the proportion of large particles. However, by carefully regulating the rate and order of addition of the ingredients, the nonionic surface active agents of this invention may be used alone in preparing the aqueous poly(ethyl acrylate) emulsion. The conditions used here were chosen to simplify the procedure. In fact, the use of nonionic surface active agents in these circumstances is known to the art.

To this solution there was added 0.07 part of sodium bicarbonate. The solution was heated to 60° C. and 0.08 part of ammonium persulfate in 1.4 parts of water was added. Then 4.0 parts of ethyl acrylate was added. This mixture was heated until the temperature was 73-74° C. and the addition of 36.84 parts of ethyl acrylate was begun. The ethyl acrylate was added over a period of 90 minutes while the temperature was maintained between 79 and 81° C. After the addition of the ethyl acrylate was completed 0.03 part of ammonium persulfate in 1.4 parts of water was added, and the mixture was maintained at 79 to 81° C. for 30 minutes. Then an additional 0.03 part of ammonium persulfate in 1.4 parts of water was added and the mixture maintained an additional 60 minutes at temperature. A stable emulsion of poly(ethyl acrylate) was produced. This was cooled and filtered through a silk screen. The conversion of ethyl acrylate was more than 99%.

At room temperature, 62.5 parts of the starch paste was diluted with 4.65 parts of water. Then 1.25 parts of the surface active agent used in Example 1 was blended with the diluted paste. Finally, 30.6 parts of the poly(ethyl acrylate) emulsion was blended with the paste. The mixture was well stirred for more than 15 minutes and the emulsion formed was stable. It was tested as a size, as described above, and the delamination force was 19.1 grams.

Dacron yarn was sized with the composition of this example at 7.5% and at 15% solids. The average values were 175 and 243 cycles respectively in an abrasion test as described in Example 1.

EXAMPLE 3

This example illustrates the effect of varying the number of oxyethylene groups in the surface active agent. A series of copolymers was prepared as described in Example 1 using one part of the hypochlorite-oxidized starch to one part of ethyl acrylate to produce an emulsion containing 25% solids. The surface active agent was used in the proportion of 5.6% of the starch monomer. The stable emulsion that was produced was diluted to 7.5% copolymer and the sizing test was performed on the series with the results set forth in Table 1. The surface active agent was the nonylphenoxy ether of polyoxyethylene which is sold as the Igepal CO- series, as indicated in the table.

Table 1

| Number of Oxyethylene Groups | Trade Name Series Number | Delamination Load (Grams) |
| --- | --- | --- |
| 1.5 | 210 | 6.7 |
| 4.0 | 430 | 16.4 |
| 6.0 | 530 | 34.9 |
| 9.5 | 630 | 34.7 |
| 15.0 | 730 | 22.9 |
| 30.0 | 880 | 28.3 |
| 100.0 | 990 | 12.6 |

Based on this data I prefer to use surface active agents in which the number of oxyethylene units is in the range of 6 to 70. However, as is clear from the table, greatly improved results are obtained over the entire range from about 2 to about 120 oxyethylene units.

EXAMPLE 4

The method of Exmaple 3 was repeated substituting the octyl phenyloxy ether of polyoxyethylene containing 9 oxyethylene units (sold as "Triton X-100"). The delamination test was performed and the delamination force required was 30 grams.

EXAMPLE 5

The method of Example 3 was repeated substituting for the surface active agent the compound dodecyl thioether of polyoxyethylene in which the oxyethylene chain contained 8.5 oxyethylene units (sold as Nonic 234). The de-lamination sizing test was performed, and 14.1 grams was the force required to de-laminate.

EXAMPLE 6

The procedure of Example 3 was repeated in all essential details except that the concentration of surface active agent was varied. The results are displayed in Table 2. Of the samples in Table 2, the first two were at a 1:1 starch monomer ratio while the last three were at a 46:54 starch to monomer ratio. Other things being equal, this relatively small change in starch to monomer ratio makes little difference in the results. The proportion is based on the total weight of starch and monomer.

Table 2

| Concentration of surface active agent: | De-lamination force (grams) |
| --- | --- |
| 5.6% | 30.7 |
| 11.1% | 30.7 |
| 16.3% | 18.3 |
| 21.7% | 14.7 |
| 27.1% | 9.2 |

EXAMPLE 7

Using essentially the procedure of Example 1, butyl acrylate was substituted for ethyl acrylate. The measured de-lamination force was 26.8 grams.

EXAMPLE 8

This example illustrates the effect of the starch on the sizing properties of poly(ethyl acrylate). An ethyl acrylate emulsion was prepared essentially as described in Example 2. To it was added 5% of the same surface active agent used in Example 3. Duplicate de-lamination tests were performed using this emusion alone and the same emulsion mixed with a starch paste as described in Example 2 with the ratio of starch to monomer at 1:1. The concentration of the surface active agent was the same in both samples and the solids content in the de-lamination test was 7.5% for both samples.

Using the mixture of starch and ethyl acrylate, the de-lamination force was 18.6 grams while with the ethyl acrylate emulsion alone the de-lamination force was only 5.2 grams.

EXAMPLE 9

This example further illustrates the effect of starch. The procedure of Example 8 was repeated except that no additional surface active agent was added either to the ethyl acrylate emulsion or the physical mixture of starch paste and ethyl acrylate emulsion. The force for the de-lamination of the sample sized with the physical mixture of starch and ethyl acrylate was 14.1 grams while for the ethyl acrylate alone the force required was only 4.3 grams.

EXAMPLE 10

This example illustrates the effect of the concentration of the surface active agent on a physical mixture of starch and ethyl acrylate. The procedure of Example 2 was followed except that the emulsifier added after polymerization was varied as shown in Table 3. The concentration is based on the total weight of starch and acrylate polymer.

Table 3

| Concentration of surface active agent added: | De-lamination force (grams) |
|---|---|
| 2.5% | 17.3 |
| 5.0% | 18.8 |
| 7.5% | 15.4 |
| 10.0% | 16.2 |
| 15.0% | 12.3 |

EXAMPLE 11

This example illustrates the effect of replacing part of the ethyl acrylate with a co-monomer. The procedure followed was essentially the same as Example 1 except that the proportion of the co-monomer shown in Table 4 replaced a portion of the ethyl acrylate. Each of the samples was prepared with 50 parts of starch and 50 parts of monomer total, and in each case the balance of the co-monomer was ethyl acrylate.

Table 4

| Co-monomer | Parts | De-lamination Force (Grams) |
|---|---|---|
| Methacrylic Acid | 1 | 15.4 |
| Do | 5 | 12.5 |
| Acrylic Acid | 1 | 19.6 |
| Do | 5 | 15.2 |
| Itaconic Acid | 1 | 42.1 |
| Do | 5 | 16.5 |
| Maleic Anhydride | 1 | 35.1 |
| Do | 5 | 36.6 |
| Acrylamide | 1 | 35.1 |

In this table there was a slight variation in the emulsifier content; the first three samples were at 6.5% and the remaining samples were at 5% based on the starch-and-monomer weight.

EXAMPLE 12

The procedure of Example 1 was repeated using the lauryl ether of polyoxyethylene containing 4 and 23 oxyethylene units (sold under the trade names "Brij 30" and "Brij 35," respectively). The measured de-lamination force was 18.8 grams for the 4-unit compound and 14.1 grams for the 23-unit compound.

EXAMPLE 13

The procedure of Example 1 was repeated with dioctylphenoxypolyoxyethylene (known as "Igepal DM–880") as the surface active agent. The measured de-lamination force was 11.5 grams.

EXAMPLE 14

The procedure of Example 1 was repeated with tridecylphenoxypolyoxyethylene (known as "Igepal RC–880") as the surface active agent. The measured de-lamination force was 22.6 grams.

EXAMPLE 15

The procedure of Example 1 was repeated with varying ratios of starch to monomer. A slightly different oxidized starch was used. The results are tabulated in Table 5.

Table 5

| Ratio: starch to monomer | De-lamination force (grams) |
|---|---|
| 10/90 | 7.5 |
| 20/80 | 10.9 |
| 30/70 | 48.5 |
| 40/60 | 19.6 |

While with this particular combination of starch and monomer the results appear to reach a peak at the 30/70 ratio, this peak apparently shifts when the variety of starch is changed, for example, to a dextrin. The shift may be attributed to changes in the molecular weight or structure of the starch, or to both. In any event I have found that useful results are obtained over the range of ratios from about 7:3 to about 1:19.

In applying the sizing compound of this invention to yarns before weaving, an aqueous dispersion of about 2 to 20% solids is used. The dispersion is continuously circulated through the size box in which a definite volume is maintained. The fibers are drawn over rolls through the volume of size in the size box where they become coated with the sizing compound. The fibers are then drawn first through squeeze rolls and then through a drying section in which the fibers are heated sufficiently to dry them. They may be dried by contact with a heated cylinder or by a hot-air blast and are then re-wound.

In a pilot trial of the sizing composition of Example 1, 150 ends of Dacron warp yarn 15 inches in width and 62 yards in length were sized at 2.5% solids. The dry can temperature was 180° F. The sized yarn (70 denier, 34 filament) was woven on a narrow loom to produce a 100 x 76 plain-weave fabric. Excellent weaving efficiency was obtained, and there was no can sticking and no size film build-up in the size box. A similar pilot trial was conducted on the product of Example 2, and at 8% solids with a 210° F. drying temperature, excellent results were obtained. I have found, in general, that a higher solids content is required for the physical blend (such as Example 2), but there is no other substantial difference between the physical blend and the graft copolymer.

Since many embodiments of the invention may be made and since many changes may be made in the embodiments described, the foregoing is to be interpreted as illustrative only and the invention is defined in the appended claims.

I claim:

1. A yarn-sizing composition consisting essentially of an aqueous dispersion of gelatinized starch and the polymer of the acrylic acid ester of an alkanol of from two to four carbon atoms, said dispersion containing up to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to acrylic ester lying in the range of 7:3 to 1:19.

2. A yarn-sizing composition consisting essentially of an aqueous dispersion of the graft copolymer obtained by reacting gelatinized starch and the acrylic acid ester of an alkanol of from two to four carbon atoms in the presence of a free radical catalyst, said dispersion containing from 1% to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to acrylic ester lying in the range of 7:3 to 1:19.

3. A yarn-sizing composition consisting essentially of a blend of an aqueous starch paste and an aqueous emulsion of the polymer of the acrylic acid ester of an alkanol of from two to four carbon atoms, said blend containing up to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to acrylic ester lying in the range of 7:3 to 1:19.

4. The composition of claim 1 in which the acrylic ester is ethyl acrylate.

5. The composition of claim 1 in which the acrylic ester is butyl acrylate.

6. The composition of claim 1 in which a co-monomer is included with the acrylic ester, the co-monomer being selected from the group consisting of methacrylic acid, acrylic acid, itaconic acid, maleic anhydride and acrylamide, the co-monomer content being up to 10% by weight of the acrylic ester.

7. The composition of claim 2 in which the acrylic ester is ethyl acrylate.

8. The composition of claim 3 in which the acrylic ester is ethyl acrylate.

9. A method of preparing a yarn-sizing composition that comprises reacting gelatinized starch with the acrylic acid ester of an alkanol of from two to four carbon atoms in the presence of a free radical catalyst to form a graft copolymer and including in the composition up to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to acrylic ester lying in the range of 7:3 to 1:19.

10. The method of preparing a yarn-sizing composition that comprises blending an aqueous starch paste with an aqueous emulsion of the polymer of the acrylic acid ester of an alkanol of from two to four carbon atoms and including in the blend up to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to acrylic ester lying in the range of 7:3 to 1:19.

11. The method of claim 9 in which the acrylic ester is ethyl acrylate.

12. The method of claim 9 in which the acrylic ester is butyl acrylate.

13. The method of claim 10 in which the acrylic ester is ethyl acrylate.

14. In the process of sizing that comprises applying to a yarn an aqueous dispersion of a sizing compound and drying the yarn, the improvement comprising applying, as said sizing compound, gelatinized starch and the polymer of the acrylic acid ester of an alkanol of from two to four carbon atoms, said dispersion containing up to 30% (based on the combined starch and acrylic ester weight) of a nonionic surface active agent whose water soluble portion is a polyoxyethylene of from 2 to 120 oxyethylene units and whose water-insoluble portion contains at least one alkyl group of four to 18 carbon atoms, the ratio of starch to arcylic ester lying in the range of 7:3 to 1:19.

15. The method of claim 14 in which the acrylic ester is ethyl acrylate.

16. The method of claim 14 in which the acrylic ester is butyl acrylate.

17. The composition of claim 3 in which a comonomer is included with the acrylic ester, the comonomer being selected from the group consisting of methacrylic acid, acrylic acid, itaconic acid, maleic anhydride and acrylamide, the comonomer content being up to 10% by weight of the acrylic ester.

18. A process of sizing yarn prior to weaving into a fabric that comprises drawing said yarn through an aqueous sizing bath containing between 2 and 20% of a sizing composition consisting essentially of gelatinized starch and the polymer of the acrylic acid ester of an alkanol of from 2 to 4 carbon atoms, said dispersion containing up to 30% (based on the combined starch and acrylic ester weight) of a nonionic surface active agent whose water-soluble portion is a polyoxyethylene of from 2 to 120 oxyethylene units and whose water-insoluble portion contains at least one alkyl group of 4 to 18 carbon atoms, the ratio of starch to acrylic ester lying in the range of 7:3 to 1:19.

19. The process of claim 18 in which the aqueous sizing bath contains the graft copolymer of said starch and polymer of said acrylic acid ester obtained by polymerizing said ester in the presence of the starch and a free-radical catalyst under free-radical polymerization initiating conditions.

20. The process of claim 19 in which a co-monomer is included with the acrylic acid ester, the co-monomer being selected from the group consisting of methacrylic acid, acrylic acid, itaconic acid, maleic anhydride and acrylamide, the co-monomer content being up to 10% by weight of the acrylic ester.

References Cited in the file of this patent

UNITED STATES PATENTS

| | | |
|---|---|---|
| 2,385,714 | La Piana et al. | Sept. 25, 1945 |
| 2,914,495 | Gordon et al. | Nov. 24, 1959 |

FOREIGN PATENTS

| | | |
|---|---|---|
| 462,398 | Canada | Jan. 10, 1950 |
| 703,005 | Great Britain | Jan. 27, 1954 |

OTHER REFERENCES

Ind. and Eng. Chem., vol. 37, page 365 (1945).

Surface Active Agents, Schwartz-Perry (1949), pp. 204 and 205.

Handbook of Material Trade Names, Zimmerman and Lavine, page 292.

Kerr: "Chemistry and Industry of Starch," published by Academic Press, Inc., New York, 1950, 2nd edition, page 165.

UNITED STATES PATENT OFFICE
CERTIFICATE OF CORRECTION

Patent No. 3,061,472                October 30, 1962

Charles E. Brockway

It is hereby certified that error appears in the above numbered patent requiring correction and that the said Letters Patent should read as corrected below.

Column 5, line 17, for "Examples 1 and 2. 34 parts" read -- Example 1 and 2.34 parts --.

Signed and sealed this 10th day of December 1963.

(SEAL)
Attest:
ERNEST W. SWIDER
Attesting Officer

EDWIN L. REYNOLDS
Acting Commissioner of Patents